Dec. 25, 1962 A. MACOVSKI 3,070,654

CHROMINANCE CHANNEL CONTROL APPARATUS

Filed Feb. 13, 1961 2 Sheets-Sheet 1

INVENTOR.
ALBERT MACOVSKI
BY W. H. Spouagle
ATTORNEY

Dec. 25, 1962 A. MACOVSKI 3,070,654

CHROMINANCE CHANNEL CONTROL APPARATUS

Filed Feb. 13, 1961 2 Sheets-Sheet 2

INVENTOR.
ALBERT MACOVSKI
BY
W. H. Spouagle
ATTORNEY 3,070,654
Patented Dec. 25, 1962

3,070,654
CHROMINANCE CHANNEL CONTROL APPARATUS

Albert Macovski, Palo Alto, Calif., assignor to Radio Corporation of America, a corporation of Delaware Filed Feb. 13, 1961, Ser. No. 88,961
10 Claims. (Cl. 178—5.4)

This invention relates generally to color television receivers and, particularly, to new and improved apparatus for controlling the chrominance channel thereof.

The standard composite color television signal supplied to color television broadcast receivers includes a chrominance component comprising color subcarrier waves phase and amplitude modulated in accordance with hue and saturation. The standard signal additionally includes, for the purposes of synchronizing the recovery of color information from the modulated color subcarrier waves in the receiver, periodically recurring bursts of color subcarrier frequency oscillations of reference phase and amplitude.

In color television receiver design, it is customary to provide a chrominance channel for amplification of the modulated color subcarrier waves prior to their application to suitably synchronized demodulating apparatus. The color information recovered by the demodulating apparatus from the chrominance channel output is suitably combined with luminance information separately amplified in a luminance channel in order to reconstitute the televised color image.

When the color synchronizing burst is absent from the received composite signal, as in black and white broadcasts, or is very low in amplitude for a variety of possible reasons, it is recognized as desirable to disable the color signal processing circuitry, as by cutting off the chrominance channel, whereby the receiver reproduces a black and white image only. This function is commonly designated as the "color killer" function.

While the usual color television receiver incorporates automatic gain control apparatus akin to that employed in the usual black and white television receiver for the usual purposes, it has been recognized that it may be additionally desirable to supplement such overall gain control of the composite signal with a selective gain control of the chrominance channel. The saturation of colors in the image reproduced by the receiver is dependent upon the ratio of amplitudes of the color subcarrier waves and the luminance signal component. There are a number of factors which may cause an undesired variation in such ratio, which variations will not be corrected by any overall gain control of the composite signal. To eliminate such undesired variations, the additional selective gain control of the chrominance channel is thus often provided, with reliance on the reference amplitude color synchronizing bursts to supply the control information. This selective gain control function is commonly designated as the "automatic chroma control" (ACC) function.

In a straightforward approach to the accomplishment of both the color killer and automatic chroma control functions in the chrominance channel of a given receiver, there has been employed a two-stage chrominance amplifier; the gain of the first chrominance amplifier stage is controlled in accordance with burst amplitude to accomplish the automatic chroma control function, while the second chrominance amplifier stage is subject to disabling or enabling in accordance with the absence or presence of synchronizing bursts of significant amplitude in the received signal. With this two-stage approach, it is usual to supply the burst separator input from the output of the first chrominance amplifier stage, whereby the path for bursts when received is continuously available to accomplish "unkilling" when the receiver stands in a "color killed" condition.

In U.S. Patent No. 2,894,061, issued to Oakley and Rhodes on July 7, 1959, novel circuitry is disclosed whereby both of the color killer and automatic chroma control functions may be accomplished in a single chrominance amplifier stage, and in response to a single control voltage input. Associated tehcniques are described whereby the problem of providing a path for bursts when received to accomplish unkilling of a receiver standing in a killed condition is solved despite the accomplishment of both functions in the same stage. The control voltage responsive amplifier stage in the Oakley et al. patent acts as a "self-killing" circuit, thereby eliminating the need for conventional color killer tubes and associated circuitry. The particular circuitry disclosed in the Oakley et al. patent exploits that characteristic of an amplifier including a controlled electron flow path device of the "constant current" type (e.g. a pentode vacuum tube or semiconductor amplifier) whereby the gain of the amplifier is a function of the output electrode (e.g., anode or collector) voltage below a certain voltage level. In accordance with one specific form of the Oakley et al. invention an otherwise conventional pentode-type chrominance amplifier which is subject to automatic chroma control is provided with a direct current impedance in its anode circuit. This impedance is of such value that, as the ACC voltage varies the amplifier bias from a normal negative value for color signal reception to a substantially less negative value during reception of a monochrome signal, the operating point of the pentode is shifted below the knee of its characteristic curve. Thus, the anode voltage and, therefore, the amplifier gain are changed from a normal operative condition to a substantially inoperative one, thereby effectively disabling the color channel of the receiver.

The present invention is directed to an improvement on the Oakley et al. circuits. In operation, it achieves functions similar to those achieved by the Oakley et al. circuitry; i.e., a control voltage responsive to the amplitude of the color synchronizing bursts is applied to the input circuit of a chrominance amplifier stage to control its gain inversely with respect to burst amplitude, the gain increasing with decreasing burst amplitude until arrival at a predetermined threshold value whereupon the amplifier stage cuts itself off. The achievement of cut-off of the amplifier stage when gain exceeds a certain value is, however, achieved in a different manner than that shown in the Oakley et al. patent. The novel manner of achieving this effect requires the presence in the amplifying tube of a second control grid or a suppressor grid having a control characteristic. The bias on this additional grid is made responsive to the D.C. voltage on the screen grid of the amplifying tube, as by resistive coupling therebetween. As the gain of the amplifying tube increases with decreasing burst amplitude, the screen grid draws an increasing amount of current, lowering the screen voltage and driving the additional grid in a negative direction. When the additional grid goes sufficiently negative, plate current is cut off and all of the cathode current is diverted to the screen grid. The killing action is regenerative since diversion of current to the screen causes increase in screen current which further decreases the voltage on the additional grid to increase the diversion. As a result of this regenerative feature, a sharp, positive switching action highly desirable for color killing is achieved. This sharp cut off action is accomplished in use of the present invention without detracting from the many desirable advantages of the general approach to the Oakley et al. patent, i.e., the accomplishment of both color killer and ACC functions in a single statge requiring only a single control voltage input, the elimination of the conventional color killer tube and associated circuitry, etc.

To assure the ability to unkill the chrominance channel once it has been placed in a killed condition, several approaches are available for use in the herein described system. The burst separator input may be derived from the screen grid circuit of the controlled amplifying stage; since screen current is not cut off when the channel is in the killed condition, the burst channel is open even under the killed condition, whereby a path for the bursts when received is available to develop an enabling voltage when required. Another approach is to supply positive pulses to the additional grid in time coincidence with the burst interval whereby an output may be developed in the plate circuit during the burst interval even in the killed condition; with such an arrangement, the burst separator input may be coupled to the plate circuit of the controlled amplifier stage.

The control voltage input may be simply burst amplitude responsive, and may be derived by merely peak rectifying an output of the burst separator. However, it has been heretofore recognized that, for such purposes as noise immunity, it is desirable that the color killer function be "synchronous." Where it is particularly desired to achieve the advantages of a so-called "synchronous color killer," the control voltage input to the controlled amplifier stage may be derived from a synchronous detector heterodyning the received bursts with the locally generated color oscillations.

A primary object of the present invention is thus to provide novel and improved apparatus for controlling the chrominance channel of a color television receiver.

A further specific object of the present invention is to provide a color television receiver with a novel and improved color killer and automatic chroma control system of the type wherein both color killer and ACC functions are effected in the same chrominance amplifier stage.

An additional object of the present invention is to provide novel means for achieving sharp, positive color killer action in a chrominance amplifier in association with the achievement of automatic chroma control in the same stage.

Other objects and advantages of the present invention will be recognized by those skilled in the art after a reading of the following detailed description and an inspection of the accompanying drawings in which.

Figures 1, 2, 3:
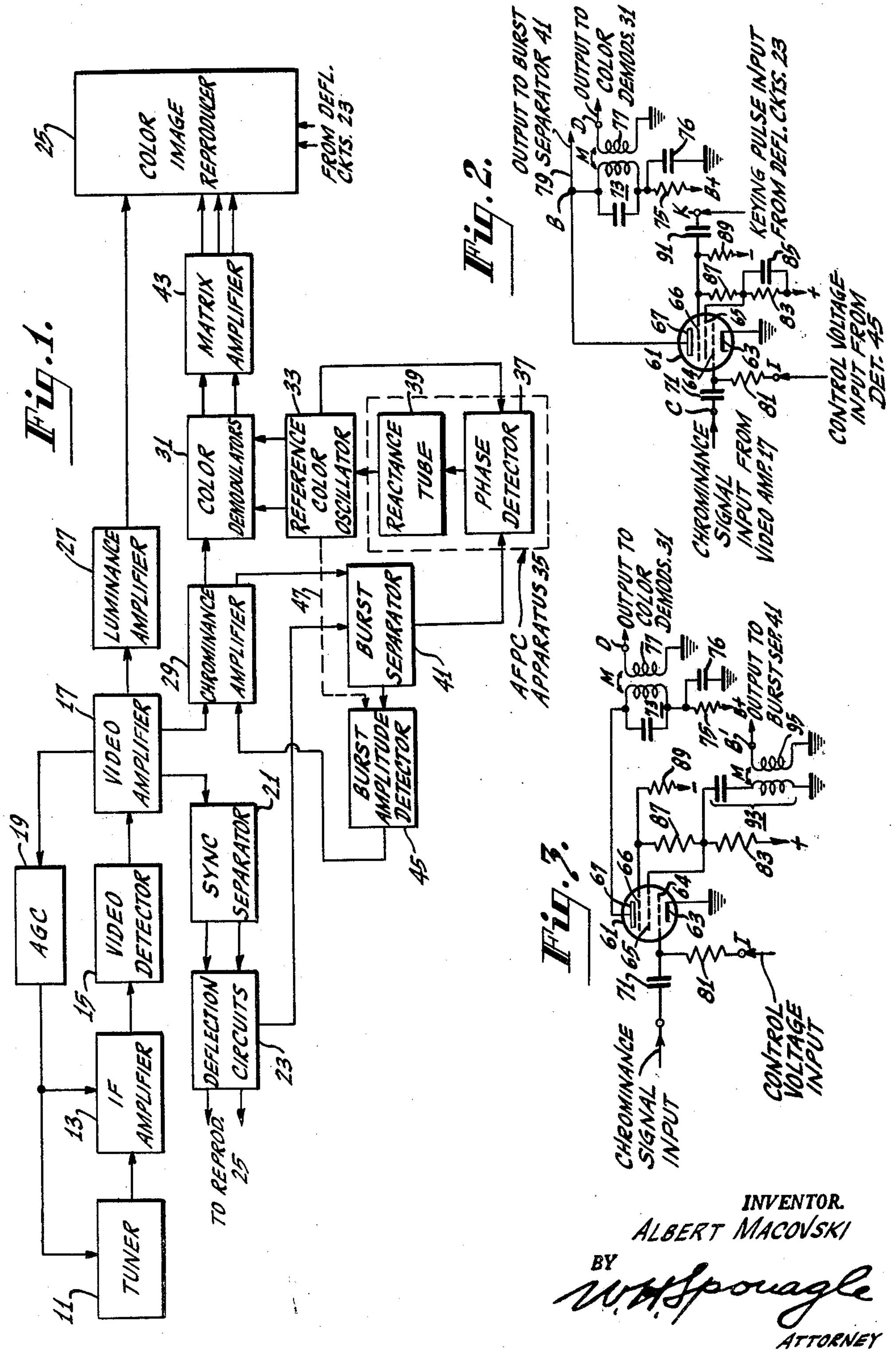
FIGURE 1 illustrates in block diagram form the color television receiver setting of the present invention.
FIGURE 2 illustrates schematically an embodiment of the present invention which may be utilized in the color television receiver apparatus of FIGURE 1.
FIGURE 3 illustrates schematically a modification of the circuitry of FIGURE 2 in accordance with a further embodiment of the present invention.

In FIGURE 1, the head end of the illustrated color television receiver comprises a tuner 11, which responds to the reception of broadcast television signals to produce intermediate frequency signals bearing composite television signal modulation, which signals are supplied to the intermediate frequency (IF) amplifier 13. The IF amplifier 13 output is supplied to a video detector 15, which demodulates the modulated IF carrier to recover a composite video signal. A separate detector (not illustrated) may be conventionally provided to also respond to the IF amplifier 13 output to provide, in accordance with well known intercarrier sound techniques, a sound IF signal for driving the receiver's sound channel (also not illustrated).

The output of the video detector 15 is supplied to a video amplifier 17 which amplifies the detected composite video signal, and supplies the amplified signals to a number of the operating circuits of the receiver. One of the outputs of video amplifier 17, for example, is supplied to automatic gain control apparatus 19, which may be of the well known keyed AGC variety, responding to variations in the amplitude of the deflection synchronizing pulses of the detected composite signal to produce a control potential which is used to control the gain of amplifying stages in the tuner 11 and IF amplifier 13 in a direction compensating for such variations. Another output of video amplifier 17 is applied to a sync separator 21 which separates respective horizontal and vertical deflection synchronizing pulses from the detected composite signal, the separated pulses being supplied to deflection circuits 23 to suitably synchronize the generation of deflection waves used to develop a scanning raster in the color image reproducer 25.

Another output of video amplifier 17 is supplied to a luminance amplifier 27, which serves to amplify the luminance component of the composite signal for application to the reproducer 25. Where the reproducer 25 takes the form of the well known three-beam, shadow-mask color kinescope, the luminance (Y) signal output of amplifier 27 may be conventionally applied in common to the cathodes of the three electron guns of the color kinescope. Another output of the video amplifier 17 is applied to a chrominance amplifier 29, which has a bandpass characteristic for selectively amplifying only the chrominance component of the detected composite signal, the chrominance component comprising the color subcarrier and its sidebands. The chrominance amplifier 29 output is applied to color demodulators 31 for synchronous demodulation of the color subcarrier to produce color-difference signal outputs. To effect the desired synchronous demodulation, a local source of unmodulated subcarrier frequency waves of a reference phase is required. Such a source is constituted by reference color oscillator 33, which nominally operates at the color subcarrier frequency, and which is controlled in frequency and phase by AFPC (automatic frequency and phase control) apparatus 35, comprising a phase detector 37 comparing the oscillator 33 output with received color synchronizing bursts to derive control information for adjusting a reactance tube 39 associated with the frequency determining circuits of the oscillator 33.

The color synchronizing burst input to the phase detector 37 is supplied from a burst separator 41, which may comprise a suitable gate circuit coupled to the output of chrominance amplifier 29 and controlled by suitably timed gating pulses (derived, for example, from the deflection circuits 23) to pass signals only during the recurring time intervals occupied by the color synchronizing bursts.

Where the color image reproducer 25 is of the aforementioned three-beam, shadow-mask color kinescope type with luminance-driven cathodes, it is usual to require the chrominance information supplied to the reproducer to be in the form of red, green and blue color-difference signals (R—Y, G—Y and B—Y) for separate application to respective ones of the control grids of the kinescope's three electron guns. While signals of such form may be derived from the modulated color subcarrier waves directly through the use of three demodulators operating at the respective phases associated with these color difference signals, it is common practice, for a variety of reasons including circuit economy, to rather utilize only two color demodulators with subsequent matrixing apparatus for converting the demodulator outputs to the desired signal forms. In accordance with such practice, the illustrated receiver employs a matrix amplifier 43, operating on the outputs of demodulators 31 to develop the desired color difference inputs for the color image reproducer 25.

For further details of a receiver of the general type described above, reference may be made, for example, to the RCA Service Data Pamphlet No. 1960 T-5, illustrating the CTC-10 color television receiver chassis manufactured by Radio Corporation of America.

The present invention is concerned with arrangements of the circuitry of the chrominance amplifier 29 and associated apparatus, whereby performance of the previously mentioned ACC and color killer functions may be most advantageously achieved. To carry out such functions, a control voltage input to the chrominance amplifier 29 is required which is indicative of the amplitude of the color synchronizing burst component of the received composite signals. FIGURE 1 shows this control voltage input as being supplied by a burst amplitude detector 45 responding to an output of the burst separator 41. As previously noted, this control voltage source may, for example, simply take the form of a peak detector of the separated burst component, whereby the only input required is the separated burst. In a particularly advantageous form of the invention, however, the control voltage source is desirably of the synchronous detector type, whereby an additional input in the form of reference oscillations from the local source 33 is required. Supply of such an additional input is inidcated in FIGURE 1 by the dotted-line lead 47.

In FIGURE 2, there is illustrated schematically a form which the circuitry of the chrominance amplifier 29 may take in accordance with an embodiment of the present invention. A chrominance signal amplifying device is illustratively shown as a pentode 61. Chrominance signals, as from an output of the video amplifier 17 of FIGURE 1, are supplied to an input circuit associated with the cathode and first grid electrodes (63 and 64, respectively) of the pentode 61. Specifically, the chrominance signal application is achieved by the coupling of a capacitor 71 between the first grid 64 and a chrominance signal input terminal C, to which a chrominance signal component output of the video amplifier 17 may be applied. Preferably associated with the chrominance signal component path to input terminal C (but not illustrated in FIGURE 2) is suitable bandpass filtering apparatus for selecting the chrominance signal component to the relative exclusion of the low frequency luminance component of the composite color television signal processed by the video amplifier 17. The cathode 63 is directly returned to a point of reference potential (e.g., chassis ground potential).

A tuned output circuit is associated with the anode 67 of the chrominance amplifier tube 61, across which output circuit an amplified version of the chrominance signal input may appear. Specifically, the anode circuit of tube 61 includes a parallel resonant circuit 73 interposed in series with a load resistor 75 in the connection of the anode 67 to a source (not fully illustrated) of suitable positve operating potential B+. The load resistor 75 is bypassed by capacitor 76. The parallel resonant circuit 73 is tuned to present an appreciable impedance at the frequencies of the chrominance signal component, and serves as further chrominance signal bandpass selection apparatus. An output winding 77, mutually inductively coupled to the inductance element of the parallel resonant circuit 73, supplies the chrominance amplifier output to a chrominance signal output terminal D, for application to the color demodulators 31 of the FIGURE 1 receiver. A chrominance signal path to the input of the burst separator 41 of the FIGURE 1 receiver is provided by lead 79 connected to a second chrominance signal output terminal B, positioned at the anode end of the parallel resonant circuit 73.

In the performance of the previously mentioned automatic chroma control function, it is desired to vary the gain of the chrominance amplifier circuit inversely in accordance with the magnitude of a control voltage input representative of the undesired variations in the chrominance signal amplitude. To achieve this desired gain control, a control voltage input, comprising a direct current voltage representative of the undesired chrominance signal variations, is applied as a variable bias to the control grid 64 of tube 61. The control voltage, developed in the burst amplitude detector 45 as previously described, appears at a control-voltage input terminal I; resistor 81 provides a direct current path between the terminal I and the control grid 64. The control voltage, illustratively of a negative D.C. polarity, becomes less negative when the undesired chrominance signal variation causes a decrease in chrominance signal amplitude, and becomes more negative when the undesired chrominance signal variation causes an increase in chrominance signal amplitude. The bias variation introduced by the control voltage application causes a variation in the gain of the chrominance amplifier stage which tends to compensate for the undesired variation of the chrominance signal input amplitude. With the control voltage being responsive to the output of burst separator 41, in turn responsive to the output of the chrominance amplifier stage, a closed loop gain control system is provided which may serve to accurately maintain the chrominance signal input to the color demodulators 31 substantially free of undesired amplitude variations.

In accordance with the present invention, novel means are provided in addition to those chrominance amplifier circuit components heretofore described, for accomplishing the color killer function in the same chrominance amplifier stage, and utilizing as controlling information the same control voltage input which serves to provide the automatic chroma control function. To appreciate how this is accomplished, one must now consider the circuitry associated with two additional electrodes of the tube 61, viz., screen grid 65 and third grid 66. The screen grid 65 is returned to a source of positive D.C. potential by means of a resistor 83. The screen resistor 83 is bypassed for chrominance signal frequencies by capacitor 85. The third grid 66 of tube 61 is connected to an intermediate point of a voltage divider formed by the screen resistor 83, a resistor 87 providing a D.C. interconnection between the grids 65 and 66, and a resistor 89 connected between the third grid 66 and a source of negative D.C. potential.

The values of resistors 83, 87 and 89 are chosen so that, under normal gain conditions for the chrominance amplifier, the junction between resistors 87 and 89 to which third grid 66 is connected is at a suitable positive D.C. potential relative to the grounded cathode 63. However, as the burst amplitude decreases, causing the control voltage input to grid 64 to go in the positive direction to introduce a compensating gain increase, the screen grid 65 draws an increasing amount of current. This increase in screen current causes an increased voltage drop across resistor 83. As a consequence, the junction between resistors 87 and 89 swings in a negative direction, driving the third grid 66 more negative. When the gain increase becomes sufficient to drive grid 66 more negative than the cathode 63, the third grid 66 diverts current from the plate 67 to the screen grid 64. A regenerative action ensues, with the increased screen current driving grid 66 further in the negative direction, causing still greater diversion of current from plate to screen. As a result, the plate is quickly driven to cutoff, with substantially all of the cathode emission current flowing to the screen grid 65. Under such conditions the output circuit associated wtih the plate 67 is no longer supplied with the chrominance signals for application to demodulators 31, and the receiver stands in a color killed condition, the appropriate condition to be obtained when burst amplitude decreases below a useful level or when burst disappears at the beginning of monochrome transmission.

Thus, the desired color killer action is achieved in the same chrominance amplifier stage that is subjected to automatic chroma control. Indeed, a single control voltage input suffices to accomplish both functions in the controlled amplifier stage. The color killing action, furthermore, is achieved without need for a separate color killer device as usually required heretofore. In all of these respects, the present invention is akin to the system disclosed in the previously mentioned Oakley et al. patent. However, a particular advantage over the specific Oakley et al. circuits is to be noted in the regenerative action achieved through the third grid control, whereby a positive "snap-action," color killing is accomplished. A further improvement may be noted in that the circuitry of the present invention permits use of a normal operating point on the plate transconductance characteristic of the amplifier device, together with the use of a plate resistor of normal magnitude.

In view of the coupling of the burst separator 41 input to the plate 67 of tube 61, a difficulty is imposed in accomplishing the "unkilling" of the chrominance channel once it is killed. In other words, to remove the negative potential from the third grid 66 which is maintaining the plate 67 cutoff, the burst separator 41 must be able to recognize the return of a burst of appropriate amplitude whereby to derive a control voltage sufficiently more negative to reduce the screen current. In the FIGURE 2 circuit, to assure such capability to effect unkilling when appropriate, keying pulses of positive polarity, timed to coincide with the burst interval, are applied to the third grid 66. Specifically, keying pulses of the desired characteristic, derived, for example, from the deflection circuits 23, are supplied to a keying pulse input terminal K, which is in turn coupled via capacitor 91 to the third grid 66. The keying pulse amplitude is chosen, relative to the negative D.C. potential at which the third grid 66 is maintained during color killing by the action of the voltage divider 83, 87, 89, so that the grid 66 is driven sufficiently positively during the burst interval that a burst appearing in the input signal will be permitted to pass to the plate 67 for application to the burst separator 41. If the burst thus passed is of sufficiently large amplitude, it will cause generation of a control voltage by burst amplitude detector 45, which control voltage will be sufficiently negative to decrease the current drawn by screen grid 65 to a level permitting the third grid 66 to swing more positive than the cathode 67.

In FIGURE 3, a modification of the circuitry of FIGURE 2 is illustrated in schematic detail. Circuit components of comparable circuit location and function in both figures are labeled with the same reference numerals in both figures. It will be seen that the chrominance amplification, automatic chroma control and color killer functions are achieved in the same manner in both circuits. A point of difference between the two circuits, however, is the location of the burst takeoff. Whereas in the FIGURE 2 circuit, the burst separator input was derived from the plate circuit of the tube 61, by connection from the burst separator to an output terminal B positioned at the plate termination of the resonant circuit 73, the burst takeoff in the FIGURE 3 circuit is associated with the screen grid 65 of tube 61. Specifically, the screen bypass capacitor 85 of the FIGURE 2 circuit is replaced in the FIGURE 3 circuit by a series resonant circuit 93 (tuned to the color subcarrier frequency). An output winding 95 having one end grounded is mutually inductively coupled to the inductance element of the series resonant circuit 93. The burst separator input is coupled to an output terminal B′ positioned at the high potential end of the output winding 95.

By association of the burst takeoff with the screen grid circuit of the chrominance amplifier, the need for the keying pulse input utilized in the FIGURE 2 circuitry is obviated. That is, the screen grid 65 of tube 61 continues to draw current whether the chrominance channel is in the killed or unkilled condition; even when a decrease in burst amplitude has caused a cutoff of the plate 67, whereby no chrominance signals are applied to color demodulators 31, an amplified version of the chrominance signal input appears across the screen grid output circuit. Thus, a path to the burst separator input for the burst component of the received signal is always maintained open, whether the signal path to the color demodulators remains open or is blocked.

Figure 4:
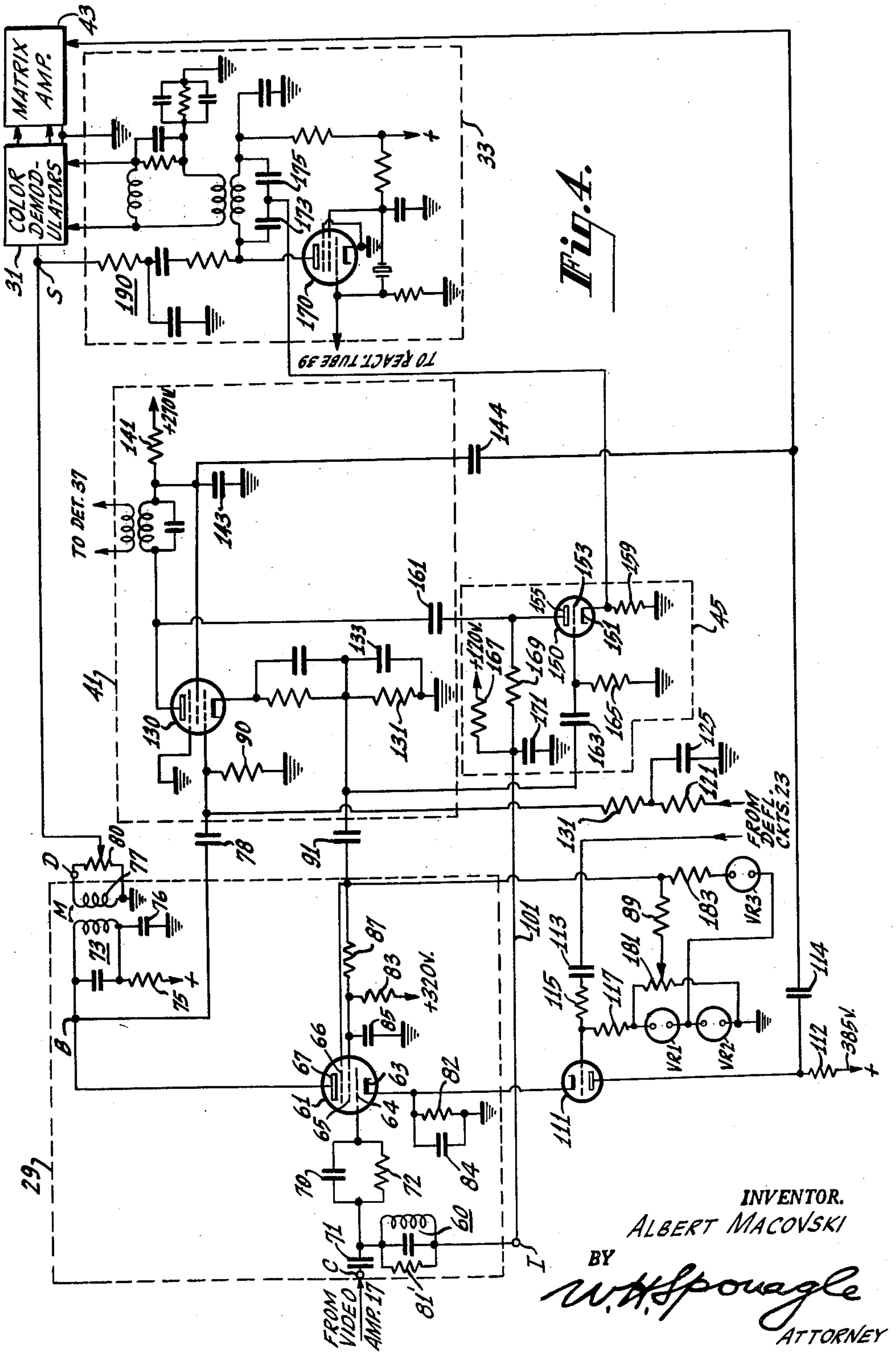
FIGURE 4 illustrates schematically a specific embodiment of the present invention in which synchronous color killer action is achieved.

In FIGURE 4, a specific embodiment of the present invention is illustrated in conjunction with details of associated color television receiver circuitry of a particularly advantageous form. Where appropriate, the same reference numerals used in the preceding figures are again employed. The overall organization of the circuitry of FIGURE 4 is analogous to that in the preceding figures. Thus, a chrominance amplifier 29 amplifies the chrominance signal component of the video amplifier 17 output for application to color demodulators 31, and to burst separator 41. The burst separator output is applied to a phase detector 37 to achieve automatic frequency and phase control of a local color oscillator 33. The oscillator 33 output is supplied in suitable phases to the color demodulators 31 to effect synchronous demodulation of the color subcarrier waves. The color difference signal outputs of demodulators 31 are combined in matrix amplifier 43 to obtain suitable driving signals for the color image reproducer 25.

The output of burst separator 41 is also applied to a burst amplitude detector 45 to obtain a control voltage for application to the input circuit of chrominance amplifier 29. The chrominance amplifier 29 comprises a pentode-type amplifying tube 61, as in FIGURE 2. The control voltage derived from detector 45 is applied via a lead 101 to the control voltage input terminal I. A D.C. path from terminal I to the first grid 64 of tube 61 is provided via damping resistor 81′ (shunted by a chrominance signal bandpass selecting tuned circuit 60) and a series grid resistor 72 (bypassed for chrominance signal frequencies by capacitor 70). Chrominance signal application to first grid 64 is achieved by coupling of capacitor 71 between input terminal C and the junction of resistors 81 and 72. The amplified chrominance signal appears across resonant circuit 73 in the anode circuit of tube 61; as in FIGURE 2, the signal takeoff for the burst separator 41 is at a terminal B at the anode end of resonant circuit 73, while the demodulators 31 are driven from a winding 77 inductively coupled to the inductance element of resonant circuit 73. The control grid of burst separator tube 130 is coupled to terminal B by means of a capacitor 78, while the chrominance signal input terminal S of color demodulators 33 derives an adjustable input via connection to the movable terminal of a saturation control potentiometer 80, having its fixed terminals connected respectively to opposite ends of winding 77.

The control voltage supplied via lead 101 serves as a variable bias for grid 64, causing the gain of the chrominance amplifier 29 to vary inversely with respect to undesired burst amplitude variations detected by burst detector 45; i.e., increases in the amplitude of the burst delivered to the detector 45 will change the bias on grid 64 in a negative-going direction, while decreases in the delivered burst amplitude will change the bias of grid 64 in a positive-going direction. The automatic chroma control function is thus achieved in the same manner as in FIGURE 2.

Also, the interconnection of the resistor 87 between the third grid 66 and the screen grid 65 of tube 61 permits the attendant achievement of the color killer function as previously described. Thus, until the received burst either disappears entirely or drops below a predetermined useable level, the screen grid 65 draws insufficient current to impose a potential on the third grid 66 more negative than the potential on cathode 63. Most electrons emitted by the cathode 63 are free to pass to the anode 67. However, when the burst amplitude drops below the useable level, the bias on grid 64 shifts sufficiently in the positive direction to cause the drawing of an amount of screen grid current which results in the lowering of the potential of grid 66 below that of cathode 63, with the ultimate effect of cutting of electron flow to the plate 67.

Positive-going keying pulses, applied to grid 66 through capacitor 91, assure, however, that electrons may flow to plate 67 during each burst interval, even when the receiver stands in a color killed condition.

The circuit of FIGURE 4 illustrates, in addition to the components previously described, a tube 111, performing a blanking function, inter alia. To fully appreciate the relationship of blanker tube 111 to other components of the receiver's chrominance channel, reference may be had to U.S. Patent No. 2,835,728, issued to R. D. Flood et al. on May 20, 1958, and entitled "Television Receiver With Color Signal Gate," and to U.S. Patent No. 2,901,534, issued to C. B. Oakley on August 25, 1959, and entitled "D.C. Stabilized Amplifier." As pointed out in the Flood et al. patent, it is desirable to prevent the demodulators from supplying signals corresponding to a demodulated burst to the color image reproducer. To prevent such a result, the Flood et al. patent describes circuitry serving to prevent the application of bursts to the color demodulators.

In the Oakley patent, it is recognized that stabilization of the D.C. operating point of the matrix amplifiers may be simply achieved by driving the grid-cathode diode of each amplifier tube into conduction during the retrace interval. By this means, the direct current in each amplifier tube is rendered substantially insensitive to effects of tube aging, cathode aging, variations in cathode temperature, tube replacement, etc.

In practice, color television receivers have been designed to utilize a tube analogous to the above mentioned blanking tube 111 to serve the purposes just discussed with respect to the Flood et al. and Oakley patents. Thus, for example, in the RCA CTC–10 receiver (previously referred to), a so-called blanker tube is caused to respond to horizontal flyback pulses derived from the receiver's deflecting circuits. A positive-going blanking pulse developed in the cathode circuit of the blanker tube is applied to the cathode of the chrominance amplifier tube to drive the tube to cut-off during a substantial portion of the retrace interval inclusive of the burst interval. This accomplishes the result desired in the Flood et. al. patent by preventing the application of bursts to the color demodulators. A negative-going blanking pulse output is derived from the anode circuit of the blanker tube and applied in common to the cathodes of the matrix amplifier tubes, to accomplish the D.C. stabilization purposes referred to in the Oakley patent. The two described functions of the blanker tube in this receiver complement each other in that blanking of the chrominance amplifier during the retrace interval results in the provision of an input signal to the matrix amplifying tubes which is substantially "clean" (i.e. free of variations) during the application of the stabilizing pulses. Also, in the CTC–10 color receiver, the outputs of the matrix amplifiers are D.C. coupled to the respective control grids of the color kinescope; the pulsing of the matrix amplifier tubes into grid current conduction during the retrace interval additionally serves to drive the color kinescope control grids in a negative direction so as to produce blanking of the kinescope beams during the horizontal retrace intervals.

FIGURE 4 illustrates a mode of cooperation between a blanker tube 111, a self-killing chrominance amplifier tube 61 of the type contemplated by the present invention, and other components of a color receiver including burst separator, matrix amplifier, etc., whereby the advantages of the present invention may be achieved without sacrificing the performance advantages attending the circuits described in the Flood et al. and Oakley patents, and heretofore achieved in commercial receivers such as the RCA CTC–10.

It may be noted that the blanker tube 111 of FIGURE 4 supplies a pulse output from its cathode to the chrominance amplifier 29, and supplies an opposite polarity pulse output from its anode to the matrix amplifier 43, as did the blanker tube of the CTC–10 receiver. A difference, however, resides in the character of wave shaping circiuitry in the grid circuit of the blanker tube 111; the wave shaping circuitry includes coupling capacitor 113, series resistor 115 and shunt resistor 117, whose relative values are chosen to effect sufficient differentiation of the flyback pulses so that the resultant output pulses are narrowed and terminate prior to the burst interval. That is, the output pulses of the blanker tube 111 coincide with an earlier portion of each horizontal retrace interval than that occupied by the color synchronizing burst. For convenience of description, these output pulses of blanker tube 111 will be referred to hereinafter as "early" pulses.

In contrast, a wave shaping circuit associated with the path of application of flyback pulses to the grid of burst separator tube 130 serves to develop "late" pulses. This latter wave shaping circuit, including series resistors 121 and 123, and shunt capacitor 125, and terminating in grid leak resistor 90, provides sufficient integration of the flyback pulses to cause actuation of the burst separator tube only during a portion of each horizontal retrace interval which is later than the portion associated with the blanker tube output pulses, and which later portion does include the burst interval. The burst separator 41, in addition to supplying a high frequency burst output to phase detector 37 and burst detector 45, also is utilized to provide several pulse outputs. Thus, for example, across a burst separator cathode resistor 131, suitably bypassed for chrominance signal frequencies by capacitor 133, appears a positive-going pulse output, which may conveniently be described as comprising "late" pulses. Also, across the burst separator tube's common plate and screen load resistor 141, suitably bypassed for chrominance signal frequencies by capacitor 143, appears a negative-going "late" pulse output.

It will be seen from the foregoing that the blanker tube 111 and burst separator 41 together provide suitable sources of both polarities of both "early" and "late" pulses. The utilization of these pulses is as follows: The positive-going "early" pulses appearing at the cathode of blanking tube 111 across cathode resistor 82, shunted by capacitor 84, are applied to the cathode of chrominance amplifier tube 61 to cut off tube 61 during the early portion of the horizontal retrace interval. The negative-going "early" pulses appearing at the anode of blanker tube 111 across load resistor 112 are applied via capacitor 114 to the cathodes of the tubes (not schematically shown) of matrix amplifier 43 to drive these tubes into grid current conduction during the early retrace interval portion. The negative-going "late" pulses appearing at the anode of the burst separator tube 130 are also applied (via capacitor 144) to the cathodes of the matrix amplifier tubes to maintain grid current flow during the "late" retrace portion. The positive-going "late" pulses appearing at the cathode of the burst separator tube 130 are applied (1) via capacitor 91 to the third grid 66 of the chrominance amplifier tube 61 to assure electron flow to the anode 67 during the burst interval, even under the color killed condition; and (2) via capacitor 163 to the control grid of the phase detector 45 tube 150 to key the phase detector tube on during the burst interval.

The results of the foregoing pulse applications are the following: The "early" pulse blanking of chrominance amplifier tube 61 assures provision of a "clean" signal to the matrix amplifier 43 during the application thereto of the grid current producing "early" pulses from the anode of the blanker tube 111. Restriction of the chrominance amplifier tube 61 blanking to the early portion of the retrace interval permits use of the technique of positive pulsing of grid 66 during the "late" burst interval to assure unkilling capability. Application of the negative-going "late" pulses from the burst separator anode to the matrix amplifiers 43 to maintain grid current during the "late" burst interval serves to prevent a demodulated burst from lighting up the screen of the color reproducer (by assuring blanking of the kinescope beams during such intervals).

For further consideration of the above described "early" and "late" pulse techniques, reference may be made to a copending application, Serial No. 88,968, entitled "Color Television Receiver Control Apparatus," filed concurrently herewith for W. H. Moles and R. N. Rhodes. In another Moles and Rhodes application, Serial No. 88,713, entitled "Burst Detector," and also filed concurrently herewith, there is presented a detailed consideration of the operation of a synchronous burst amplitude detector of the unique form specifically illustrated in FIGURE 4.

For present purposes, the operation of the detector 45 apparatus of FIGURE 4 may be briefly summarized as follows: Local color oscillations, derived from a capacitance divider 173–175 in the resonant plate circuit of tube 170 of oscillator 33, are applied to the cathode 151 of the triode 150, and appear across cathode resistor 159. Separated bursts from the output of burst separator 41 are applied via a capacitor 161 to the anode 155 of the triode 150. Positive-going keying pulses, derived from the cathode of burst separator tube 130, are applied via capacitor 163 to the control grid 153 of triode 150. Grid leak bias is developed across the grid leak resistor 165, in response to the keying wave application, so as to limit conduction of the triode 150 to the time of the "late" pulse occurrences, i.e. to each burst interval. Positive plate potential is applied to anode 155 through resistors 167 and 169; the magnitude of the positive energizing potential and the magnitudes of resistors 167 and 169 are chosen so that the potential to which the anode 17 is effectively "clamped" during each conducting period is substantially zero potential.

The amplitude of the local color oscillations applied across cathode resistor 159 are chosen with respect to the tube 150 cut-off so as to insure a small conduction angle; i.e., triode 150 is rendered conducting within the keying interval only during a small portion of each negative half cycle of the local color oscillations, the conducting portion corresponding to the negative peak of the oscillatory wave. The phase of the applied oscillations is chosen so that, if bursts are present in the received signal with sufficient magnitude to properly synchronize oscillator 33, the bursts appear at anode 155 in a 180 degree out-of-phase relationship to the local color oscillations on cathode 151. The effect of conduction of tube 150 on the negative peaks of the local oscillations will be to clamp the positive peaks of the burst of the received bursts at a substantially zero potential. During the other portions of the burst interval when tube 150 is not conducting, the bursts will swing the anode 155 in a negative direction away from the zero clamping potential, which results in a negative average voltage being developed across the output filter capacitor 171. The magnitude of the negative potential will vary with the degree to which the bursts swing the anode negatively away from the zero clamping potential; i.e., the negative potential developed will vary in accordance with the amplitude of the bursts. There is thus provided a negative control potential suitable for application via lead 101 to the control voltage input terminal I of the chrominance amplifier 29.

Among the advantages of the specific burst detector circuitry just described is substantial noise immunity. Due to the random phase relationship of noise to the local color oscillations, the long term average potential developed across output filter capacitor 171 by noise will be zero. A more detailed explanation of this point will be found in the aforementioned concurrently filed Moles and Rhodes application.

It will be appreciated that the present invention is in no way restricted to use with a particular form of control voltage source. Thus, in contrast with the synchronous burst detector described above, a simple burst amplitude detector of the peak detector type may alternatively constitute the source of the control voltage to be applied to terminal I. In this connection, it may be observed that, while the block diagram of FIGURE 1 suggests that a separate burst detector be provided to generate the chrominance amplifier control voltage, it is not necessary to provide separate detecting apparatus for this purpose. Rather, a well known practice is to utilize one of the diodes of the detector already provided for color oscillator AFC purposes as a source of the desired control voltage.

In FIGURE 2, it was noted that the third grid 66 of the chrominance amplifier tube 65 was returned to a suitable source of negative potential by means of resistor 89. FIGURE 4 illustrates one way in which a negative potential of suitable magnitude may be derived in the color receiver apparatus. The blanker tube 111 responds to the periodic application of positive keying pulses on its grid by developing, via grid leak bias action, a negative D.C. potential on its grid. By inserting a pair of voltage regulator devices VR1 and VR2 in series with the grid leak resistor 117, a reliable, steady, negative potential source is made available for the bias use. A potentiometer 181 is shunted across the voltage regulator pair, and the resistor 89 is connected to the adjustable tap on the potentiometer 181, whereby selection of the magnitude of the negative bias potential to be utilized is permitted. It will be readily seen that the potentiometer 181 thus provides a convenient color killer threshold control. Resistor 183 is connected in series with a third voltage regulator device VR3 between third grid 66 and the junction between VR1 and VR2 to further assure the stability of the selected negative D.C. potential.

A neutralizing problem may be presented where, as in FIGURE 4, the burst separator input and the color demodulator inputs are derived from the same amplifier output. Thus, for example, if triodes are used as the color demodulators, local oscillations applied to the triodes may readily find a path through interelectrode capacitances of the triodes to the common take-off point, and thus appear in the burst channel to disturb synchronization. To neutralize this undesired feedback, a neutralizing circuit 190 is provided between the anode of the oscillator tube 170 and the chrominance signal input terminal S of demodulators 31 to cancel out the undesired feedback signals.

In a particular working example of the circuitry of FIGURE 4, the following circuit constants were employed with satisfactory results:

| | | |
|---|---|---|
| Resistor 72 | | 10K |
| Resistor 75 | ohms | 47C |
| Resistor 81 | | 15K |
| Resistor 82 | ohms | 220 |
| Resistor 83 | | 47K |
| Resistor 87 | megohms | 1 |
| Resistor 89 | | 680K |
| Resistor 90 | | 68K |
| Resistor 112 | | 100K |
| Resistor 115 | ohms | 6800 |
| Resistor 117 | | 100K |
| Resistor 121 | | 27K |
| Resistor 123 | | 56K |
| Resistor 131 | | 2.7K |
| Resistor 141 | | 1.8K |
| Resistor 159 | ohms | 330 |
| Resistor 165 | megohms | 2.7 |
| Resistor 167 | do | 4.7 |
| Resistor 169 | | 100K |
| Resistor 181 | megohms | 1 |
| Resistor 183 | | 100K |
| Capacitor 70 | mmf | 181 |
| Capacitor 71 | mmf | 18 |
| Capacitor 76 | mmf | 330 |
| Capaictor 78 | mmf | 22 |
| Capacitor 84 | mf | .001 |
| Capacitor 85 | mf | 0.1 |
| Capacitor 113 | mmf | 270 |
| Capaictor 114 | mf | .22 |

| | | |
|---|---|---|
| Capacitor 125 | mmf | 82 |
| Capacitor 133 | mmf | 330 |
| Capacitor 143 | mf | .001 |
| Capacitor 161 | mmf | 180 |
| Capacitor 163 | mf | .005 |
| Capacitor 171 | mf | .047 |
| Capacitor 173 | mmf | 200 |
| Capacitor 175 | mmf | 27 |
| Tube 61 | | 6DT6 |
| Tube 111 | | 6CG7 |
| Tube 130 | | 6EW6 |
| Tube 150 | | 1/2 12AT7 |
| Tube 170 | | 6GH8 |

What is claimed is:

1. In a color television receiver adapted to receive composite color television signals inclusive of a luminance component and a chrominance component as well as to receive monochrome television signals, said color television signals including a color synchronizing component which is absent from said monochrome color television signals, said color television receiver including: means for selecting said chrominance component and color synchronizing component to the relative exclusion of said luminance compoent; control apparatus comprising the combination of an electron discharge device having cathode, anode, first control grid, screen grid and additional control grid electrodes; means coupled to said selecting means for applying said selected chrominance component and color synchronizing component to said first control grid; output circuit means coupled to said anode for deriving an amplified chrominance component output; means coupled to said output circuit means for recovering said color synchronizing component; control voltage generating means coupled to said synchronizing component recovering means for developing a control voltage responsive to amplitude variations of said color synchronizing component; means coupled to said generating means for applying said control voltage as a variable bias to said first control grid; means coupled to said screen grid for developing a D.C. voltage which varies in response to variations of the bias applied to said first control grid; means for applying said varying D.C. voltage to said additional control grid; and chrominance component utilization means coupled to said output circuit means.

2. In a color television receiver including a chrominance amplifier, a burst separator, color demodulators, and a chrominance signal source, said chrominance amplifier including a multi-grid electron tube having a cathode, a first control grid, a screen grid, an additional control grid, and an anode; the combination comprising: means for applying signals from said chrominance signal source to said first control grid; a chrominance amplifier output circuit coupled to said anode; means for applying signals from said output circuit to the inputs of said color demodulators; means for additionally applying signals from said output circuit to the input of said burst separator; means coupled to the output of said burst separator for developing a control voltage representative of burst amplitude; means for applying said control voltage as a variable bias to said first control grid in such a sense as to cause the gain of said multigrid electron tube to vary inversely with respect to said burst amplitude; means for deriving a direct current voltage from said screen grid which varies with said bias variations in the sense of decreasing toward the potential of said cathode with increases in said gain; and means for applying said direct current voltage to said additional control grid.

3. In a color television receiver of the type utilizing a multigrid electron tube as a common chrominance and burst amplifier with automatic control of the gain of said common chrominance and burst amplifier in inverse proportion to the amplitude of the burst appearing in the chrominance amplifier output, apparatus for accomplishing the disabling of said chrominance amplifier whenever burst amplitude decreases below a predetermined threshold comprising the combination of: means for energizing one of the grids of said multigrid tube with a potential positive with respect to the potential of said cathode and of such magnitude as to cause said one grid to draw electrons from said cathode in an amount varying directly with the gain of said amplifier, said energizing means including impedance means causing the potential at said one grid to vary significantly with variations in the amount of electrons drawn from said cathode by said one grid; means for providing a direct current path between said one grid and another of the grids of said multigrid tube which is positioned between said one grid and said anode; and means for additionally providing a direct current path between said other grid and a source of potential negative with respect to the potential of said cathode, the magnitude of the negative potential provided by said latter source being chosen so as to result in the potential of said other grid being more negative than the potential of said cathode whenever said burst amplitude drops below said predetermined threshold.

4. In a color television receiver, the combination of: a source of signals comprising a chrominance component in the form of a modulated color subcarrier and a color synchronizing component in the form of periodic bursts of color subcarrier frequency waves; a chrominance amplifier for amplifying the signals provided by said source; chrominance component utilization apparatus coupled to an output of said chrominance amplifier; burst separator apparatus coupled to an output of said chrominance amplifier; said chrominance amplifier comprising an electron discharge device having a cathode, a first control electrode providing control of cathode emission current, first and second output electrodes, and an additional control electrode providing control of the division of cathode emission current between said first and second output electrodes, said source being coupled to said first control electrode, and said chrominance component utilization apparatus being coupled to said first output electrode; means coupled to said burst separator apparatus for developing a control voltage representative of separated burst amplitude; means for biasing said first control electrode in accordance with said developed control voltage whereby to vary the cathode emission current and the gain of said chrominance amplifier inversely with respect to variations in the separated burst amplitude; impedance means coupled to said second output electrode for causing the direct current potential at said second output electrode to vary inversely with respect to variations in cathode emission current caused by said first control electrode biasing means; and means for biasing said second control electrode in accordance with the direct current potential at said second output electrode.

5. Apparatus in accordance with claim 4 wherein said burst separator apparatus is coupled to said first output electrode.

6. Apparatus in accordance with claim 4 wherein said burst separator apparatus is coupled to said second output electrode.

7. In a color television receiver including a chrominance amplifier supplying modulated color subcarrier waves to color demodulation apparatus and having an output at which appear synchronizing bursts of color subcarrier frequency subject to undesired amplitude variations corresponding to undesired amplitude variations of said modulated color subcarrier waves, said chrominance amplifier including an electron tube having a cathode, a first control grid, a screen grid, an additional control grid, and an anode, and wherein said undesired amplitude variations of said modulated subcarrier waves are minimized by controlling the bias of said first control grid in response to said burst amplitude variations so as to vary the gain of said chrominance amplifier inversely with respect to said subcarrier wave variations; apparatus for disabling said chrominance amplifier whenever said synchronizing bursts disappear from said output or appear thereat with an amplitude less than a predetermined threshold level, said apparatus comprising the combination of: means for causing the potential at said screen grid to vary inversely with respect to said gain variations; a source of potential bearing a polarity relationship with respect to the potential at said cathode which is opposite to the polarity relationship which the potential at said screen grid bears with respect to said cathode potential; means for matrixing said variable screen grid potential and a potential derived from said source to produce a resultant potential which bears the same polarity relationship to said cathode potential as said screen grid potential whenever bursts appear at said output with an amplitude exceeding said threshold level and which bears the opposite polarity relationship in the absence of appearance of bursts at said output with an amplitude exceeding said threshold level; and means for applying said resultant potential to said additional control grid.

8. Apparatus in accordance with claim 7 including means for adjusting the potential provided by said source to said matrixing means whereby a control of said threshold level is provided.

9. Apparatus in accordance with claim 7 providing said synchronizing burst output at said screen grid, and including burst utilization apparatus coupled to said screen grid.

10. Apparatus in accordance with claim 7 providing said synchronizing burst output at said anode, and including a source of keying pulses which periodically occur in substantial time co-incidence wtih said synchronizing bursts and which bear a polarity relationship to said cathode potential which corresponds to the polarity relationship which said screen grid potential bears to said cathode, and means for applying said keying pulses to said second control grid.

No references cited.